US010453402B2

(12) United States Patent
Li et al.

(10) Patent No.: US 10,453,402 B2
(45) Date of Patent: Oct. 22, 2019

(54) METHOD AND APPARATUS FOR CONTENT ADAPTIVE BACKLIGHT CONTROL

(71) Applicant: Motorola Mobility LLC, Chicago, IL (US)

(72) Inventors: Shi-Yong Li, Los Altos, CA (US); Fred C Fettinger, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 683 days.

(21) Appl. No.: 14/669,116

(22) Filed: Mar. 26, 2015

(65) Prior Publication Data

US 2016/0284279 A1 Sep. 29, 2016

(51) Int. Cl.
*G09G 3/20* (2006.01)
*G09G 3/34* (2006.01)
*H04N 19/51* (2014.01)

(52) U.S. Cl.
CPC ... *G09G 3/3406* (2013.01); *G09G 2320/0613* (2013.01); *G09G 2320/0626* (2013.01); *G09G 2360/10* (2013.01)

(58) Field of Classification Search
CPC ............................. G09G 3/3406; H04N 19/51
See application file for complete search history.

(56) References Cited

U.S. PATENT DOCUMENTS

2007/0297511 A1* 12/2007 Chiu ...................... H04N 19/51 375/240.16
2013/0147857 A1* 6/2013 Kurikko ................... G09G 3/20 345/690
2015/0054863 A1* 2/2015 Tanaka ................. G09G 3/3406 345/691

OTHER PUBLICATIONS

Louis J Kerofsky, "Addressing color distortion in birghtness preservation for LCD backlight reduction", Jan. 2006, Journal of the SID, 14/12, pp. 1111-1116.*

* cited by examiner

*Primary Examiner* — Lin Li
(74) *Attorney, Agent, or Firm* — Loppnow & Chapa; Matthew C. Loppnow

(57) ABSTRACT

An electronic device backlight can operate at a brightness setting using content adaptive backlight control that modifies a backlight intensity based on content for display. A determination can be made as to whether video is playing on a display of the electronic device. Content adaptive backlight control aggressiveness can be adjusted when video is playing on at least a portion of the display.

9 Claims, 4 Drawing Sheets

METHOD AND APPARATUS FOR CONTENT ADAPTIVE BACKLIGHT CONTROL

BACKGROUND

1. Field

The present disclosure is directed to a method and apparatus for content adaptive backlight control. More particularly, the present disclosure is directed to adaptively controlling the backlight that illuminates a display based on content displayed on the display.

2. Introduction

Presently, electronic devices use displays to present information to users. Such information can include videos, such as movies, television shows, video clips, animated sequences, and other videos. The information can also include a user interface that can include icons, a virtual keyboard, sliders, dials, static graphics, charts, and other static graphical information that is displayed for a user. Many portable electronic devices use a backlight to illuminate a display for ease of viewability of the displayed information. Portable electronic devices also use batteries to allow a user to use the device when away from another source of power. A long battery life is important to allow a user to use the device for long periods of time without having to recharge the battery. Unfortunately, a backlight is a major user of a battery's charge, which results in the battery being depleted faster when the backlight is brighter Improved content adaptive backlight control can help extend battery life to provide for longer device usage in between charges as well as help reduce energy consumption even for devices that do not use batteries.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus for content adaptive backlight control. According to a possible embodiment, an electronic device backlight can operate at a brightness setting using content adaptive backlight control that modifies a backlight intensity based on content for display. A determination can be made as to whether video is playing on a display of the electronic device. Content adaptive backlight control aggressiveness can be adjusted when video is playing on at least a portion of the display.

Figure 1:
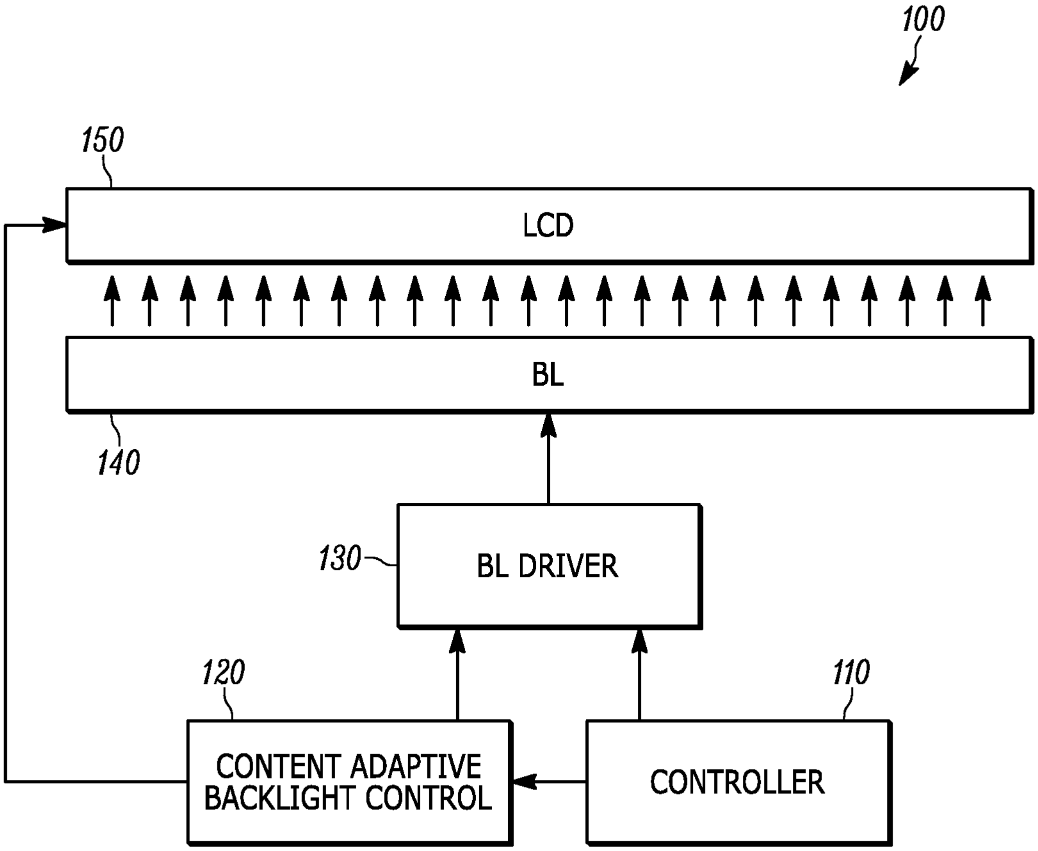
FIG. 1 is an example block diagram of an apparatus according to a possible embodiment.

FIG. 1 is an example block diagram of an apparatus 100 according to a possible embodiment. The apparatus 100 can include a controller 110, a content adaptive backlight control module 120, a backlight driver 130, a backlight 140, and a display 150, such as a liquid crystal display. The controller 110 can be a processor, a central processing unit, or any other element that can control operations of an apparatus. The content adaptive backlight control module 120 can be a dedicated content adaptive backlight control module or can be or can be part of a display driver, a thin film transistor driver integrated circuit, a liquid crystal display controller, and/or any other module that can control a display and/or a backlight.

In operation, the display 150 can display content to a user. The backlight 140 can provide light to the display 150. The backlight driver module 130 can drive the backlight 140. The content adaptive backlight control module 120 can operate the backlight 140 at a brightness setting using content adaptive backlight control that modifies backlight intensity based on content for display. The content adaptive backlight control can modify a backlight intensity and image data based on content for display to maintain a similar perceived brightness for different backlight intensity and image data while reducing backlight power consumption.

The controller 110 can detect whether video is playing on the display 150 and can adjust content adaptive backlight control aggressiveness of the content adaptive backlight control module 120 when video is playing on at least a portion of the display 150. The portion can be at least 50 percent of an area of the display. For example, the portion can be at least 50%, at least 75%, at least 80%, or any other portion useful for maintaining perceived display brightness when adjusting the brightness of a backlight based on a user's primary focus being on video on the display, such as when the video is in the foreground as opposed to in the background. According to a possible embodiment, software running on the controller 110 can perform disclosed operations. According to embodiments, the controller 110 can include hardware modules or a combination of software and hardware modules to perform disclosed operations.

The controller 110 can to detect whether video is playing by checking layer properties to determine whether a YUV layer is being displayed to detect whether video is playing on the display 150. A YUV layer can be a color space layer including a Y luma information component, a U color information component, and a V color information component. For example, other layers can use RGB to display a user interface and video layers can use a YUV format that includes luma and chroma channels. Other methods can be used to detect whether video is playing, such as when, at an application layer, a video player is playing video, and the detection can be based on a notification from the video player indicating it is playing the video or that video decoding is in progress. To elaborate on a specific implementation, an HWComposer component of an Android™ operating system running on the controller 110 can detect whether video is playing based on a YUV layer size being more than a given percent of the display 150 based on layer geometry information. The HWComposer component of Android can also detect whether video is playing by checking how many display layers exist: if only one YUV layer exists, then full screen video is playing. Other operating systems can use similar or different methods to detect whether video is playing.

The controller 110 can adjust content adaptive backlight control aggressiveness by instructing the content adaptive backlight control module 120 to adjust content adaptive backlight control aggressiveness to reduce more backlight intensity when video is playing on at least a portion of the display 150 relative to backlight intensity when video is not playing on at least a portion of the display 150. The controller 110 can also adjust content adaptive backlight control aggressiveness by instructing the content adaptive backlight control module 120 to adjust content adaptive backlight control aggressiveness to reduce more backlight intensity when video is playing on at least a portion of the display 150 relative to backlight intensity when a user interface is displayed on at least a portion of the display 150. This reduction can be performed by the controller 110 and/or the content adaptive backlight control module 120. For example, the controller 110 can adjust content adaptive backlight control aggressiveness, such as some aggressiveness to reduce more backlight intensity, by sending an adjustment signal to the content adaptive backlight control module 120 that then sends a backlight driver signal to the backlight driver module 130, where the backlight driver signal can adjust the backlight brightness based on the content adaptive backlight control aggressiveness. According to a possible embodiment, the backlight driver signal can be a pulse width modulation signal or other signal that adjusts backlight brightness. The content adaptive backlight control module 120 can perform histogram analysis on image data and use the result to determine backlight intensity and modify image data to display an image on the display 150.

The controller 110 can also detect whether video is playing by determining whether video is playing for at least a predetermined period of time. The controller 110 can then adjust content adaptive backlight control aggressiveness by selecting a first content adaptive backlight control mode to operate a backlight at a first brightness setting if video is playing for at least the predetermined period of time and selecting a second content adaptive backlight control mode to operate the backlight at a second brightness setting if video is not playing for at least the predetermined period of time.

For example, the content adaptive backlight control mode of the content adaptive backlight control module 120 can be switched dynamically. If a valid video use case is identified for more than, for example, 2 seconds or any other useful time period based on power saving and/or human perception factors, the content adaptive backlight control mode can be switched from a user interface mode to a movie mode by a display driver software interface, such as a Linux kernel display driver software interface or other display driver interface. Otherwise, a user interface mode can be switched from the movie mode immediately or can otherwise be maintained if the video use case did not last more than 2 seconds or other useful time period.

The controller 110 can limit a maximum amount of backlight brightness change during a given period of time. For example, the controller 110 can address backlight flicker when switching content adaptive backlight control mode because a change in backlight brightness may be noticeable as flicker to the human eye when switching between content adaptive backlight control modes. A smooth transition between two content adaptive backlight control modes can be made by limiting a maximum brightness change to a given value during a given pre-defined period of time.

The controller 110 can also disable content adaptive backlight control when high backlight brightness is desired. For example, a content adaptive backlight control mode can be completely turned off based on different use cases. Regardless of whether video is playing in those situations, the controller 110 can turn off the content adaptive backlight control functionality. To elaborate on one use case, in a bright environment, such as in outdoor sunlight, backlight brightness can be increased to a maximum or some high value to achieve acceptable viewability, which can result in the content adaptive backlight control functionality being turned off. In another use case, a user can set the brightness to a high value that in turn disables content adaptive backlight control modification depending on the user's needs. The feature of disabling content adaptive backlight control can be an explicit setting or can be implied based on the user selecting a high brightness setting.

According to a possible embodiment, the backlight 140 can provide light to the display 150. The backlight driver module 130 can drive the backlight 140. The content adaptive backlight control module 120 can operate the backlight 140 via the backlight driver module 130 at a brightness setting using content adaptive backlight control that modifies backlight intensity based on content for display, where the content adaptive backlight control can modify a backlight intensity and image data based on content for display to maintain a similar perceived brightness for different backlight intensity and image data while reducing backlight power consumption. The controller 110 can detect whether video is playing on the display 150 and can provide a signal to the content adaptive backlight control module 120 that directs the content adaptive backlight control module 120 to reduce backlight intensity when video is playing on at least a portion of the display 150 relative to backlight intensity when video is not playing on at least a portion of the display 150.

According to a possible embodiment, the content adaptive backlight control module 120 can be a separate hardware module from the controller 110. According to another possible embodiment, the content adaptive backlight control module 120 can be implemented on the controller 110. The controller 110 can adjust content adaptive backlight control aggressiveness by sending a signal to the content adaptive backlight control module 120 that directs the content adaptive backlight control module 120 to adjust content adaptive backlight control aggressiveness, such as by selecting a video/movie mode instead of another mode, such as a user interface mode. The controller 110 can adjust content adaptive backlight control aggressiveness of the content adaptive backlight control module 120 and then the content adaptive backlight control module 120 can adjust its content adaptive backlight control aggressiveness accordingly to adjust the intensity of the backlight 140 via the backlight driver module 130. According to a possible embodiment, the content adaptive backlight control module 120 can adjust the intensity of the backlight 140 by applying pulse-width modulation to a supply current of the backlight driver 130 and thus, quickly switch the backlight 140 off and on again based on the frequency of the pulse-width modulation to reduce power consumption.

The disclosed content adaptive backlight control mode determination process of detecting video and adjusting the aggressiveness can be completely handled by host controller 110 software. When the determination is done, the host controller 110 can send a command to the content adaptive backlight control module 120, such as a Thin Film Transistor (TFT) driver Integrated Circuit (IC), to make it switch into the desired content adaptive backlight control mode. The TFT driver IC can use different backlight saving and image enhancement policies in different content adaptive backlight control modes. Different TFT driver ICs may use different detailed policies for implementation of content adaptive backlight control, but each can have different aggressiveness, such as different content adaptive backlight control mode, settings that can be set based on the content adaptive backlight control mode determination process.

Figure 2:
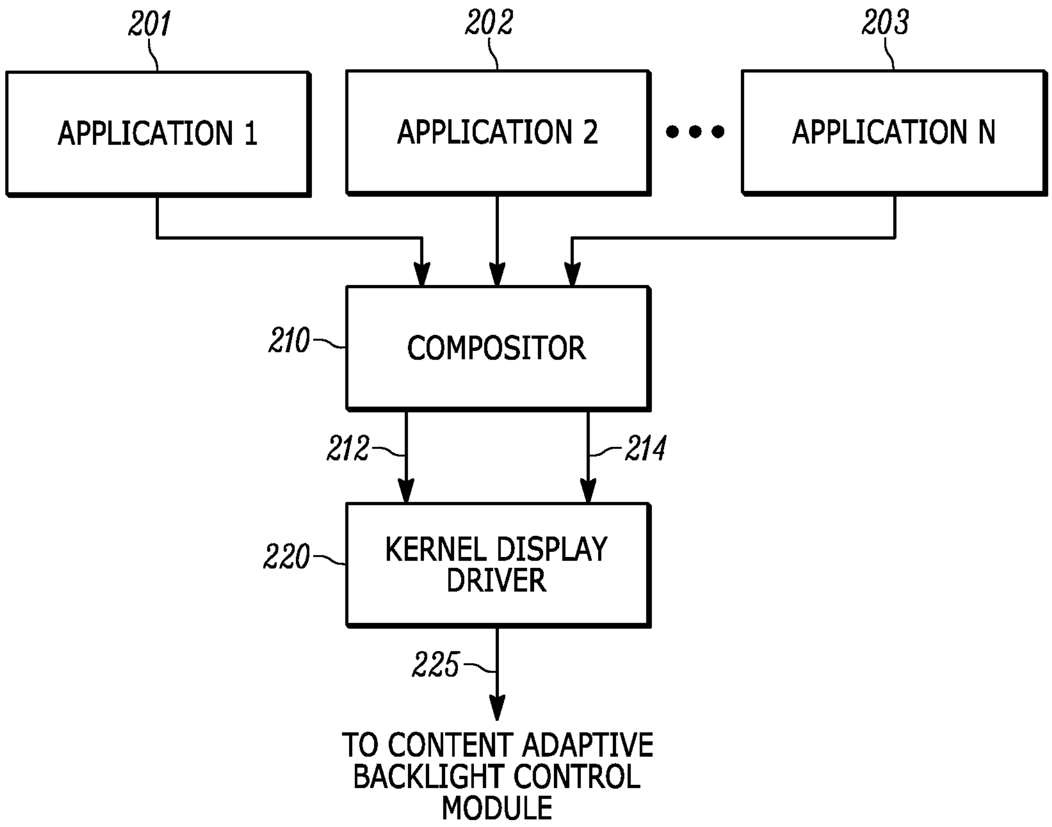
FIG. 2 is an example bock diagram of a compositor and a kernel display driver according to a possible embodiment.

FIG. 2 is an example bock diagram of a compositor 210 and a kernel display driver 220 that can operate on the controller 110 according to a possible embodiment. The compositor 210 can be or can include a window manager, a surface flinger, a HWComposer, or any other element that can composite layers together. For example, the compositor 210 can receive image data that can have multiple layers. According to a more specific example, the compositor 210 can receive image data from multiple applications 201-203, where each different application 201-203 can provide different layers of image data. According to another possible embodiment, one or more of the applications 201-203 can each provide multiple layers of image data. The compositor 210 can composite, such as combine, the multiple layers together for display and can send the composite image data 214 to the kernel display driver 220. The compositor 210 can also check if video is playing full screen or at least playing on more than a given percentage of a display. If video is playing on at least a given percentage of the display, the compositor can send a signal to the kernel display driver 220 to adjust a content adaptive backlight display mode to a video mode. The kernel display driver 220 can then send the information to the content adaptive backlight control module 120.

According to some embodiments, modern operating systems can display multiple layers on the display 150 screen simultaneously. Each layer may be a separate application, a video, a system User Interface (UI) element, or other layer. Applications can generate the image data for their own layers, and video data can be streamed to a video layer from a video decoder. A window manager can control the location of the layers on the display 150. The compositor 210 can be responsible for combining the image data from each layer into a final image that can be shown on a device display. In Android, a compositor can be called SurfaceFlinger, and it can be part of the Android Open Source Project. The SurfaceFlinger originally rendered all layers to the display's framebuffer using an OpenGL ES Application Program Interface (API). Later versions of Android added a Hardware Composer (HWC) Hardware Abstraction Layer (HAL). Device hardware manufacturers can implement this HAL to use hardware capabilities to display layers directly, so that the GPU may not need to draw the layers to a framebuffer. The dynamic content adaptive backlight control process can be implemented in the HWC because it can have detailed information about each layer on the display. The dynamic content adaptive backlight control process may also be implemented in other components, compositors, algorithms, hardware, and/or software in both Android and other operating systems.

To check YUV layer size and how it is based on layer geometry information, in the Android HWComposer module, layer geometry information, such as position, height, width, YUV format, and other geometry information, and screen resolution information, such as height and width in pixels, can be read by software or hardware. For example, the screen area can be determined based on screen height times screen width. The YUV layer area can be determined based on YUV layer height times YUV layer width. Other layer area can be determined based on other layer height times other layer width. If only YUV layer exists and there are no other layers, a video, such as a movie, content adaptive backlight control mode can be selected with more content adaptive backlight control aggressiveness, such as less brightness. If the YUV layer is on top of other layers, the movie content adaptive backlight control mode can be selected if YUV layer area is greater than some percentage, such as 80% or other useful percentage of the screen area. If YUV layer is underneath one or more other layers, the movie content adaptive backlight control mode can be selected if the YUV layer area minus all of overlay area of all of layers on top of YUV layers is greater than some percentage, such as 80% or other disclosed or useful percentage of the screen area. The YUV layer size can also be determined using a similar or other methods in other software or hardware modules in Android and/or other operating systems.

According to a possible implementation, the content adaptive backlight control mode, such as content adaptive backlight control aggressiveness, can be switched from a user interface mode to a movie mode by a Linux kernel display driver software interface, such as the kernel display driver 220. For example, the Linux kernel/display driver can be located under the surfaceFlinger/HWC from a software perspective. The HWC can detect a valid use case and can call some software interface exported by the Linux kernel/display driver to switch the content adaptive backlight control mode. During this call, the Linux kernel/display driver can load Write-Content-Adaptive-Backlight-Control-Mode MIPI Display Serial Interface (DSI) commands to the controller 110 display controller hardware, which can transfer those commands over a Mobile Industry Processor Interface (MIPI) DSI bus to a TFT driver IC, such as the content adaptive backlight control module 120. The TFT driver IC can then finish the content adaptive backlight control mode switching. The content adaptive backlight control mode can be switched from a user interface mode to a movie mode and back by other interfaces, software, and/or hardware in Android and/or other operating systems.

Figure 3:
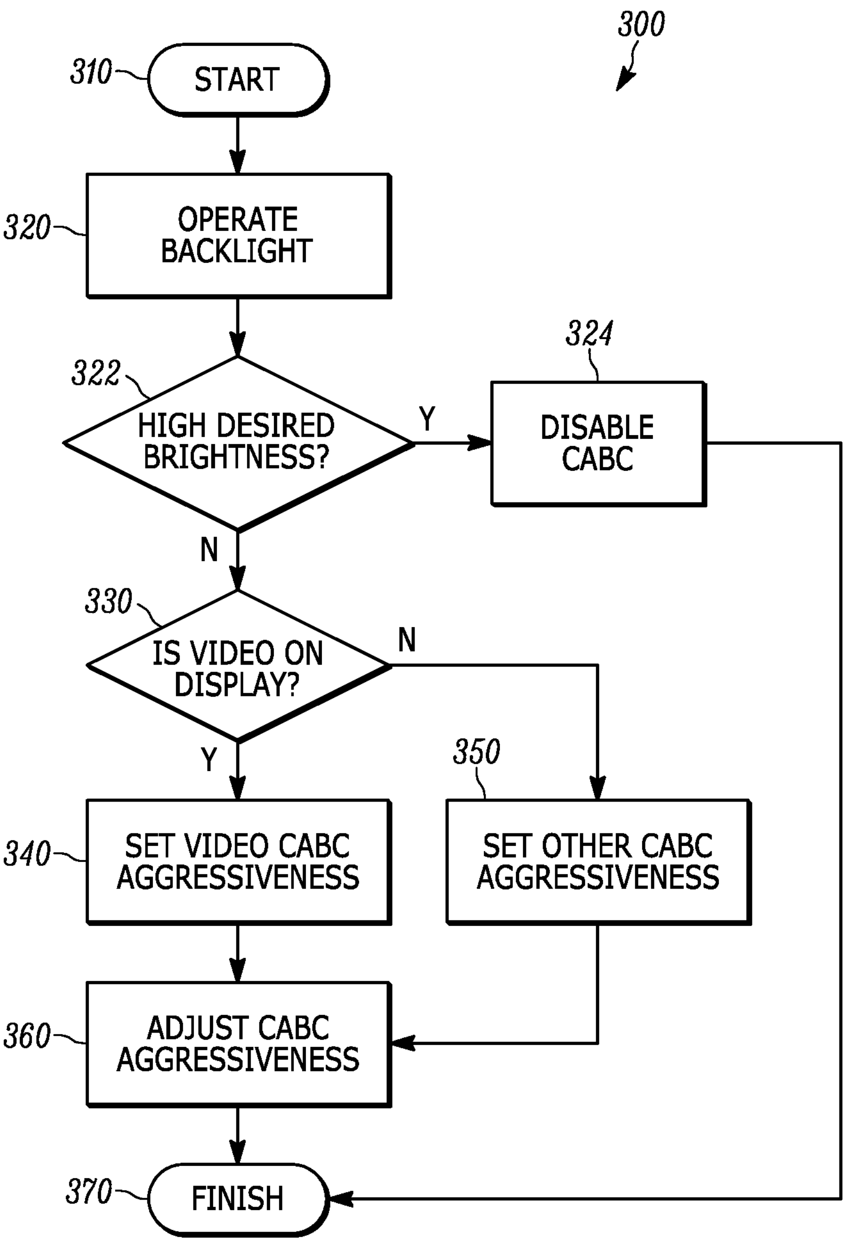
FIG. 3 is an example flowchart illustrating the operation of an apparatus according to a possible embodiment.

FIG. 3 is an example flowchart 300 illustrating the operation of an apparatus, such as the apparatus 100, according to a possible embodiment. At 310, the flowchart 300 can begin. At 320 a backlight can operate at a brightness setting using content adaptive backlight control that modifies a backlight intensity based on content for display. The content adaptive backlight control can modify a backlight intensity and image data based on content for display to maintain a similar perceived brightness for different backlight intensity and image data while reducing backlight power consumption. At 322, a determination can be made as to whether high brightness is desired. For example, this determination can be made when there is high ambient light, when the user sets a high brightness setting, when the user desires to disable content adaptive backlight control, and/or whenever content adaptive backlight control is otherwise not desired. At 324, content adaptive backlight control can be disabled when high backlight brightness is desired to provide high and/or maximum brightness regardless of what is being displayed.

At 330, whether video is playing on a display of an electronic device can be detected. Detecting can include checking layer properties to determine whether a YUV layer is being displayed to detect whether video is playing on the display, where a YUV layer comprises a color space layer including a Y luma information component, a U color information component, and a V color information component. Detecting can also include determining whether video is playing for at least a predetermined period of time. Detecting can further include features described with respect to other embodiments. At 340, video content adaptive backlight control aggressiveness can be set when video is playing on at least a portion of the display. At 350, content backlight control aggressiveness other than video content adaptive backlight control aggressiveness can be set when video is not playing on at least a portion of the display.

At 360, content adaptive backlight control aggressiveness can be adjusted based on the determined setting. Adjusting content adaptive backlight control aggressiveness can include reducing backlight intensity when video is playing on at least a portion of the display relative to backlight intensity when video is not playing on at least a portion of the display. Adjusting content adaptive backlight control aggressiveness can also include reducing backlight intensity when video is playing on at least a portion of the display relative to backlight intensity when a user interface is displayed on at least a portion of the display. Adjusting content adaptive backlight control aggressiveness when video is playing on at least a portion of the display can include sending a signal to a backlight driver module, where the signal can adjust the backlight brightness based on the content adaptive backlight control aggressiveness. Adjusting can further include selecting a first content adaptive backlight control mode to operate a backlight at a first brightness setting if video is playing for at least the predetermined period of time, and selecting a second content adaptive backlight control mode to operate the backlight at a second brightness setting if video is not playing for at least the predetermined period of time. Adjusting can additionally include limiting a maximum backlight brightness change during a given period of time. The content adaptive backlight control aggressiveness can also be adjusted based on features described in other embodiments. At 560, the flowchart 500 can end.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 4:
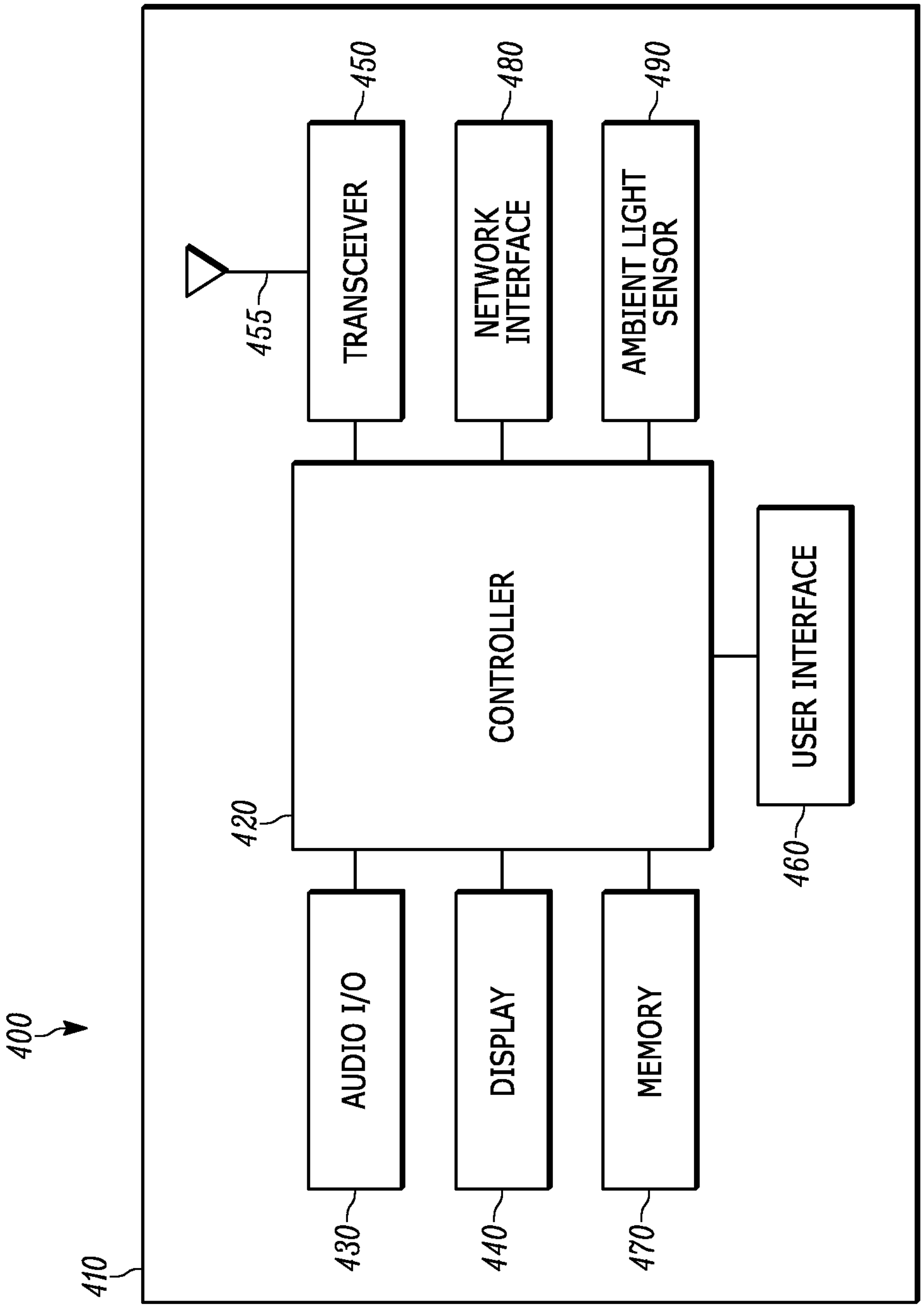
FIG. 4 is an example block diagram of an apparatus according to a possible embodiment.

FIG. 4 is an example block diagram of an apparatus 400, such as the user device 110 or the client device 120, according to a possible embodiment. The apparatus 400 can be a wireless terminal, a portable wireless communication device, a smartphone, a cellular telephone, a flip phone, a personal digital assistant, a laptop computer, a personal computer, a selective call receiver, a tablet computer, or any other device that uses a backlight to illuminate a display.

The apparatus 400 can include a housing 410, a controller 420 within the housing 410, audio input and output circuitry 430 coupled to the controller 420, a display 440 coupled to the controller 420, a transceiver 450 coupled to the controller 420, an antenna 455 coupled to the transceiver 450, a user interface 460 coupled to the controller 420, a memory 470 coupled to the controller 420, and a network interface 480 coupled to the controller 420, and an ambient light sensor 490 coupled to the controller 420. The apparatus 400 can perform the methods described in all the embodiments.

The display 440 can include elements of the apparatus 100, such as the content adaptive backlight control module 120, the backlight driver 130, the backlight 140, and the liquid crystal display 150. Alternately, the elements of the apparatus 100 can be distributed throughout the apparatus 400.

The transceiver 450 can include a transmitter and/or a receiver. The audio input and output circuitry 430 can include a microphone, a speaker, a transducer, or any other audio input and output circuitry. The user interface 460 can include a keypad, a keyboard, buttons, a touch pad, a joystick, a touch screen display, another additional display, or any other device useful for providing an interface between a user and an electronic device. The network interface 480 can be a universal serial bus port, an Ethernet port, an infrared transmitter/receiver, a USB port, an IEEE 1394 port, a WLAN transceiver, or any other interface that can connect an apparatus to a network or computer and that can transmit and receive data communication signals. The memory 470 can include a random access memory, a read only memory, an optical memory, a flash memory, a removable memory, a hard drive, a cache, or any other memory that can be coupled to a wireless communication device.

The apparatus 400 or the controller 420 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 470 or elsewhere on the apparatus 400. The apparatus 400 or the controller 420 may also use hardware to implement disclosed operations. For example, the controller 420 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 may be any controller or processor device or devices capable of operating an electronic device and implementing the disclosed embodiments. The ambient light sensor 490 can provide ambient light information to the controller 420. The controller 420 can use the ambient light information to determine if high backlight brightness is desired, such as when there is high ambient light, to disable content adaptive backlight control. The controller 420 can use other data, such as user input, to disable content adaptive backlight control, such as when the user desires high brightness and/or when the user desires to disable content adaptive backlight control.

Embodiments can make an electronic device with a display run better by reducing power consumption of a backlight when video is playing as well as by increasing brightness of a display for other displayed information, such as displayed a user interface, to maintain consistent perceived image quality, brightness, and viewability of information on the display. Because different display content types can have different image quality requirements based on human eye physical characteristics, displayed video content can require less backlight intensity than other content, such as user interface content or static content. In some embodiments, a controller can determine which content is being displayed and then most or all of image compensation and backlight adjustment can be computed by a content adaptive backlight control module, such as a display panel module. According to some experiments, battery life was extended by 40 minutes using the disclosed content adaptive brightness control process. For example, content adaptive backlight control can adjust both image data and back light intensity at the same time to ensure an image on a display does not look darker if backlight intensity is decreased to save power. Content adaptive backlight control aggressiveness can be adjusted based on different contexts, such as when a movie is playing, when a user interface is being displayed, when a display is operating in a bright environment, and/or in other situations when adjusting content adaptive backlight control can be useful. Embodiments can be more flexible and provide more power saving than previous approaches, while still maintaining acceptable image quality on a display, such as on a device screen.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. An apparatus comprising:

a display;

a backlight configured to provide light to the display;

a backlight driver module coupled to the backlight, the backlight driver configured to drive the backlight;

a content adaptive backlight control module coupled to the backlight driver module, the content adaptive backlight control module configured to operate the backlight at a brightness setting that modifies backlight intensity and image data to display based on content for display; and a controller configured to detect whether video is playing on the display and configured to modify adjustment aggressiveness of the content adaptive backlight control module when video is playing on at least a portion of the display.

2. The apparatus according to claim 1, wherein the content adaptive backlight control module modifies a backlight intensity and image data based on content for display to maintain a similar perceived brightness for different backlight intensity and image data while reducing backlight power consumption.

3. The apparatus according to claim 1, wherein the content adaptive backlight control module is configured to adjust content adaptive backlight control aggressiveness by reducing backlight intensity when video is playing on at least a portion of the display relative to backlight intensity when video is not playing on at least a portion of the display.

4. The apparatus according to claim 1, wherein the content adaptive backlight control module is configured to adjust content adaptive backlight control aggressiveness by reducing backlight intensity when video is playing on at least a portion of the display relative to backlight intensity when a user interface is displayed on at least a portion of the display.

5. The apparatus according to claim 1, wherein the controller is configured to detect whether video is playing by checking layer properties to determine whether a YUV layer is being displayed to detect whether video is playing on the display, where a YUV layer comprises a color space layer including a Y luma information component, a U color information component, and a V color information component.

6. The apparatus according to claim 1, wherein the controller is configured to detect whether video is playing by determining whether video is playing for at least a predetermined period of time, and wherein the content adaptive backlight control module is configured to adjust content adaptive backlight control aggressiveness by selecting a first content adaptive backlight control mode to operate a backlight at a first brightness setting if video is playing for at least the predetermined period of time and selecting a second content adaptive backlight control mode to operate the backlight at a second brightness setting if video is not playing for at least the predetermined period of time.

7. The apparatus according to claim 1, wherein the controller is configured to adjust content adaptive backlight control aggressiveness by sending an adjustment signal to the content adaptive backlight control module that sends a backlight driver signal to the backlight driver module, where the backlight driver signal adjusts the backlight brightness based on displayed image data.

8. The apparatus according to claim 1, wherein the controller is configured to limit a maximum amount of backlight brightness change during a given period of time.

9. The apparatus according to claim 1, wherein the controller is configured to disable content adaptive backlight control when high backlight brightness is desired.

* * * * *